US008621063B2

(12) United States Patent
Kang

(10) Patent No.: US 8,621,063 B2
(45) Date of Patent: Dec. 31, 2013

(54) METHOD AND APPARATUS FOR TRANSMITTING BYEBYE MESSAGE WHEN OPERATION OF CONTROLLED DEVICE IN UPNP NETWORK IS ABNORMALLY TERMINATED

(75) Inventor: In-pyo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1058 days.

(21) Appl. No.: 11/580,913

(22) Filed: Oct. 16, 2006

(65) Prior Publication Data

US 2007/0124449 A1 May 31, 2007

(30) Foreign Application Priority Data

Oct. 14, 2005 (KR) .................. 10-2005-0097128

(51) Int. Cl.
*G06F 15/173* (2006.01)
(52) U.S. Cl.
USPC ....................................................... 709/224
(58) Field of Classification Search
USPC ....................................................... 709/224
See application file for complete search history.

(56) References Cited

U.S. PATENT DOCUMENTS

| 6,574,197 | B1 | 6/2003 | Kanamaru et al. | |
|---|---|---|---|---|
| 2002/0083143 | A1* | 6/2002 | Cheng | 709/208 |
| 2004/0208159 | A1 | 10/2004 | Jung et al. | |
| 2005/0021737 | A1 | 1/2005 | Ellison et al. | |
| 2005/0099982 | A1 | 5/2005 | Sohn et al. | |
| 2005/0251549 | A1* | 11/2005 | Hlasny | 709/203 |
| 2006/0101109 | A1 | 5/2006 | Nishio | |
| 2006/0279774 | A1* | 12/2006 | Matsuoka et al. | 358/1.15 |
| 2007/0005746 | A1* | 1/2007 | Roe et al. | 709/223 |

FOREIGN PATENT DOCUMENTS

| EP | 1 469 654 A2 | 10/2004 |
|---|---|---|
| JP | 2000-82053 A | 3/2000 |
| JP | 2004-48152 A | 2/2004 |
| JP | 2004-200807 A | 7/2004 |
| JP | 2004-334792 A | 11/2004 |
| JP | 2005-184436 A | 7/2005 |
| JP | 2005-217974 A | 8/2005 |
| KR | 10-2005-0055134 A | 6/2005 |
| WO | 2005/011230 A1 | 2/2005 |

OTHER PUBLICATIONS

Communication from the Japanese Patent Office dated Jul. 5, 2011, in a counterpart application citing No. 2006-280545.

(Continued)

*Primary Examiner* — Maceeh Anwari
(74) *Attorney, Agent, or Firm* — Sughrue Mion, PLLC

(57) ABSTRACT

A method and apparatus for transmitting a Byebye message when an operation of a controlled device is abnormally terminated are provided. A new field is added to discovery and Event messages defined in the UPnP standard. These messages are exchanged to allow a control point to monitor the controlled device. When the operation of the controlled device is abnormally terminated, the control point monitoring the operation of the controlled device determines whether or not the operation of the controlled device is abnormally terminated according to the presence or absence of a response to a Subscription Renewal message. The control point multicasts the Byebye message over the network instead of the controlled device abnormally terminated. It is possible to notify all control points in a network that the operation of the controlled device is abnormally terminated without increasing the load on the network and compatibility problems with existing UPnP devices.

26 Claims, 18 Drawing Sheets

(56) References Cited

OTHER PUBLICATIONS

Bodlaender et al., "Enhancing Discovery with Liveness," Consumer Communications and Networking Conference, Jan. 5, 2004, pp. 636-638, IEEE, Piscataway, NJ, USA.

Extended Search Report dated Oct. 20, 2011, issued by the European Patent Office in corresponding European Patent Application No. 06122096.8.

Non-Final Rejection dated Dec. 13, 2011, issued by the Japanese Patent Office in corresponding Japanese Patent Application No. 2006-280545.

Communication dated May 7, 2013 issued by the Japanese Patent Office in counterpart Japanese Patent Application No. 2012-056389.

Communication dated May 16, 2013 issued by the European Patent Office in counterpart European Patent Application No. 06 122 096.8.

* cited by examiner

FIG. 8

| CP List | sid | Callback | ... | TimeOut (sec) | Number of Server | Manage |
|---|---|---|---|---|---|---|
| CP1 | uuid:3132-4323-... | http://192.168.0.2:8080 | ... | 300 | 3 | 0 |
| CP2 | uuid:4533-1234-... | http://192.168.0.10:8169 | ... | 300 | 2 | 0 |
| CP3 | uuid:0853-3423-... | http://192.168.0.3:9403 | ... | 3 | 1 | 1 |
| CP4 | uuid:4934-1313-... | http://192.168.0.43:80 | ... | 300 | -1 | 0 |
| CP5 | uuid:5402-1023-... | http://192.168.0.54:8080 | ... | 400 | -1 | 0 |
| ... | ... | ... | ... | ... | ... | ... |

580, 581, 582, 583

| CD List | uuid | CACHE-CONTROL (sec) | ... | Subscription Timeout | Advanced CD | Manage |
|---|---|---|---|---|---|---|
| CD1 | uuid:31af-4323-··· | 1800 | ... | 5 | 1 | 1 |
| CD2 | uuid:4a33-1fe4-··· | 1800 | ... | 300 | 1 | 0 |
| CD3 | uuid:a8b3-4fd3-··· | 1800 | ... | 2 | 1 | 1 |
| CD4 | uuid:be4a-d345-··· | 2000 | ... | 300 | 0 | 0 |
| CPD | uuid:a0b2-2d3b-··· | 3000 | ... | 150 | 0 | 0 |
| ... | ... | ... | ... | ... | ... | ... |

METHOD AND APPARATUS FOR TRANSMITTING BYEBYE MESSAGE WHEN OPERATION OF CONTROLLED DEVICE IN UPNP NETWORK IS ABNORMALLY TERMINATED

CROSS-REFERENCE TO RELATED PATENT APPLICATION

This application claims priority from Korean Patent Application No. 10-2005-0097128, filed on Oct. 14, 2005, in the Korean Intellectual Property Office, the disclosure of which is incorporated herein in its entirety by reference.

BACKGROUND OF THE INVENTION

1. Field of the Invention

The present invention relates to a method of transmitting a farewell message on a UPnP network, and more particularly, to a method and apparatus for transmitting a Byebye message when an operation of a controlled device in an UPnP network is abnormally terminated.

2. Description of Related Art

A universal plug and play (UPNP) network includes a controlled device, that is, a home network device, which is connected to an IP-based home network and a control point which controls the controlled device. The control point discovers the controlled device in the network through a discovery procedure defined in the UPnP standard. At this time, the control point may use an Simple Service Discovery Protocol (SSDP) notify message or an M-Search message. These messages will be described in detail below.

FIG. 1 is a view for explaining a method used by a controlled device 110 to discover a controlled device by using an SSDP notify message 141. The controlled device 110 transmits the SSDP notify message 141 to control points 120 and 130 through a multicast channel 140 in order to notify them that it is connected to a network. The SSDP notify message 141 includes information LOCATION on a location of a description file of the controlled device 110, Notification Type NT, information SERVER on a server, and a UUID value USN. The controlled device 110 can notify the control points 120 and 130 of an effective time period of accessing the network by using a value CACHE-CONTROL. More specifically, when the value CACHE-CONTROL is set to 1,800 seconds, the control points 120 and 130 consider the controlled device 110 to be normally connected to the network for 1,800 seconds, although the controlled device 110 does not transmit the SSDP notify message 141 again.

FIGS. 2A and 2B are views for explaining a method used by a control point 120 to discover a controlled device by using an M-Search message 151.

When the control points 120 and 130 transmit the M-Search message 151 through the multicast channel 150 in order to discover the controlled device 110, the controlled device 110 transmits a response message to the control points 120 and 130 through a unicast channel 160. Each of the control points 120 and 130 receiving the response message adds the controlled device 110 to a list of controlled devices which each of the control points 120 and 130 manages. These controlled devices can be identified by USN values included in the response message 161. Similar to the SSDP notify message 141, the response message includes the CACHE-CONTROL value, which the effective time period of the controlled device 110 is set to. More specifically, the controlled device 110 must transmit the SSDP notify message 141 indicating that the controlled device 110 is connected to the network before the CACHE-CONTROL time period elapses. When the controlled device 110 does not transmit the SSDP notify message 141, the control points 120 and 130 consider that the controlled device 110 is not connected to the network.

In addition, as shown in FIG. 3, when the controlled device 110 transmits a Byebye message through the multicast channel 170 at the time of terminating an operation, the control points 120 and 130 consider the controlled device 110 to be disconnected from the network.

Further, according to a UPnP discovery method defined in the conventional UPnP standard, the control points 120 and 130 cannot detect an abnormal termination of an operation of the controlled device 110. The abnormal termination of an operation of the controlled device 110 denotes a termination of an operation without transmitting a Byebye message 171. For example, the abnormal termination of an operation may occur due to crashing of a system of the controlled device 110 or unplugging of a network cable.

However, in this case, the control points 120 and 130 may consider the controlled device 110 to be a valid device for the CACHE-CONTROL time period. In other words, although the controlled device 110 disappears from the network, an application of the control point 120 or 130 is notified that the controlled device 110 operates normally. Due to such an incorrect notification, the application of the control point 120 or 130 may try to control the controlled device 110 which has already disappeared from the network. Particularly, in a specification of the digital living network alliance (DLNA) for setting up a home AV system using an UPnP AV technique, a recommended CACHE-CONTROL time period is 1,800 seconds. Therefore, most associated companies should comply with this recommendation. In this case, the control points 120 and 130 cannot detect the termination of an operation of the controlled device 110 for a time up to 1,800 seconds.

In addition, when the control points 120 and 130 periodically transmit the M-Search messages 151 to the controlled device 110 to detect the abnormal termination of an operation of the controlled device 120, the load on the network increases. On the other hand, if a new message is defined in the standard so as to detect the abnormal termination of an operation of the controlled device, the message may not be compatible with existing devices complying with the existing UPnP standard.

SUMMARY OF THE INVENTION

The present invention provides a method and apparatus for transmitting a Byebye message by using a minimum number of messages when an operation of a controlled device is abnormally terminated without transmitting the Byebye message in an UPnP network.

According to an aspect of the present invention, there is provided a method of notifying termination of an operation of a controlled device in a UPnP network, comprising: (a) selecting at least one of controlled devices in the network as a controlled device to be monitored in order to detect whether or not an operation of the selected controlled device is terminated without notification; (b) periodically determining whether or not the operation of the selected controlled device is terminated by using an Event message; and (c) selectively notifying the termination of the operation of the controlled device based on a result of the determination.

In the above aspect of the present invention, the (a) may comprise: (a1) transmitting a Subscription Request message with a header including a monitoring permission request message to at least one of the controlled devices; and (a2) selecting as the controlled device to be monitored a controlled device which transmits a response message to the Subscription Request message with a header including a monitoring permission message.

In addition, in the (a1), the Subscription Request message may be transmitted only to the controlled devices which are determined to be capable of analyzing the monitoring permission request message by using a Discovery message. In addition, in the (a1), the Subscription Request message with a header including information on the number of controlled devices which are currently monitored may be transmitted, so that the controlled device receiving the Subscription Request message can determine whether or not to permit the monitoring thereof with reference to the information.

In addition, the (b) may comprise: (b1) periodically transmitting a Subscription Renewal message to the controlled device; and (b2) determining that an operation of the controlled device transmitting no response to the Subscription Renewal message is terminated without transmitting a Byebye message, and the (c) may comprise multicasting the Byebye message over the network on behalf of the controlled device when the operation of the controlled device is terminated without transmitting the Byebye message as a result of the determination.

According to another aspect of the present invention, there is provided a computer readable recording medium having embodied thereon a computer program for executing the above method.

According to another aspect of the present invention, there is provided an apparatus for notifying termination of an operation of a controlled device in a UPnP network, comprising: a monitoring determination unit which selects at least one of controlled devices in the network as a controlled device to be monitored in order to detect whether or not an operation of the selected controlled device is terminated without notification; a monitoring unit which periodically determines whether or not the operation of the selected controlled device is terminated by using an Event message; and a processing unit which selectively notifies the network of the termination of the operation of the controlled device based on a result of the determination.

In the above aspect of the present invention, the monitoring determination unit may comprise: a transmitting unit which transmits a Subscription Request message with a header including a monitoring permission request message to at least one of the controlled devices; and a determination unit which selects as the controlled device to be monitored a controlled device transmitting a response message to the Subscription Request message with a header including a monitoring permission message. In addition, the transmitting unit may transmit the Subscription Request message only to the controlled devices which are determined to be capable of analyzing the monitoring permission request message by using a Discovery message. Also, the transmitting unit may transmit the Subscription Request message with a header including information on the number of controlled devices which are currently monitored, so that the controlled device receiving the Subscription Request message can determine whether or not to permit the monitoring thereof with reference to the information.

Further, the monitoring unit may comprise: a transmitting unit which periodically transmits a Subscription Renewal message to the controlled device; and a determination unit which determines that an operation of the controlled device transmitting no response to the Subscription Renewal message is terminated without transmitting a Byebye message, and the processing unit may multicast the farewell message over the network on behalf of the controlled device when the operation of the controlled device is terminated without transmitting the Byebye message as a result of the determination of the determination unit.

According to another aspect of the present invention, there is provided a method of determining a control point transmitting a Byebye message in a UPnP network when an operation of a controlled device is abnormally terminated, comprising: (a) selecting at least one control point by using an Subscription Request message; and (b) determining whether or not to update the Subscription by using a Subscription Renewal message periodically transmitted by the selected control point, wherein the selected control point multicasts the Byebye message over the network when the operation of the controlled device is terminated without transmitting the Byebye message.

According to another aspect of the present invention, there is provided a computer readable recording medium having embodied thereon a computer program for executing the above method.

According to another aspect of the present invention, there is provided a controlled device in a UPnP network, comprising: a control point selection unit which selects at least one control point by using an Subscription Request message; and an update determination unit which determines whether or not to update the Subscription by using a Subscription Renewal message periodically transmitted by the selected control point, wherein the selected control point multicasts a Byebye message over the network when an operation of a controlled device is terminated without transmitting the Byebye message.

BRIEF DESCRIPTION OF THE DRAWINGS

The above and other features and advantages of the present invention will become more apparent by describing in detail exemplary embodiments thereof with reference to the attached drawings in which:

FIG. 8 is a table used for allowing a controlled device to manage information on control points according to an exemplary embodiment of the present invention;

DETAILED DESCRIPTION OF EXEMPLARY EMBODIMENTS OF THE INVENTION

According to an exemplary embodiment of the present invention, a controlled device uses a subscription message to select a control point which is to monitor an abnormal termination of an operation of the controlled device, and when the operation of the controlled device is abnormally terminated, the control point uses a Subscription Renewal message to monitor the abnormal termination of the operation of the controlled device and transmit a Byebye message. In order to perform such procedures, in the present invention, additional headers for Discovery messages such as a notify message, an M-Search message, and a Search response message and Event messages such as a Subscription Request message, a Subscription response message, a Subscription Renewal message, and a Renewal response message are defined.

On the other hand, according to the UPnP standard, newly added headers for these messages are specified not to be included if apparatuses analyzing these added messages cannot comprehend them. Therefore, these added messages do not cause a conflict in communication with existing apparatuses. In other words, according to the present embodiment of the invention, when an operation of the controlled device capable of processing the added headers is abnormally terminated, the existing control points incapable of processing the added headers as well as the control point capable of processing the added headers can speedily monitor the abnormal termination of the operation of the controlled device.

Figure 1:
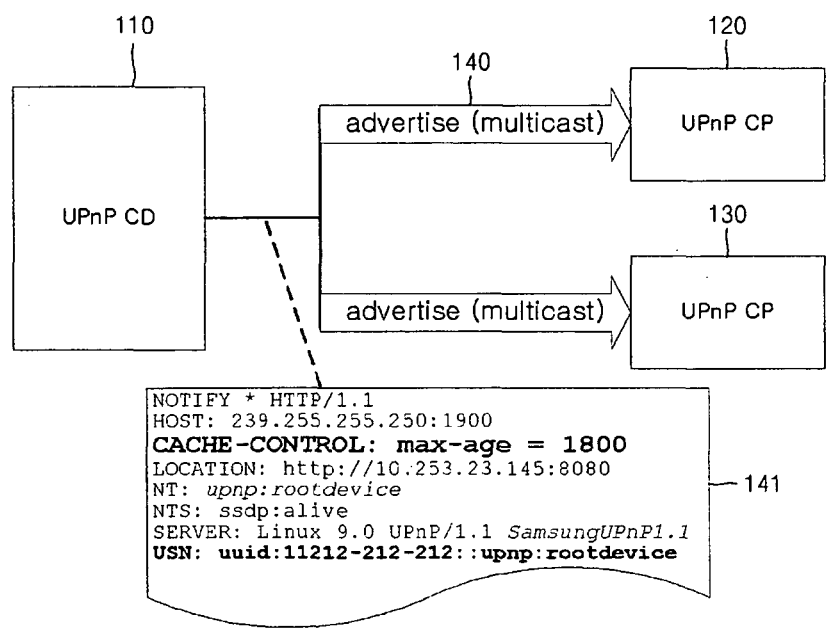
FIG. 1 is a view for explaining a conventional method used by a control point to discover a controlled device by using an SSDP notify message.
Figure 2A:
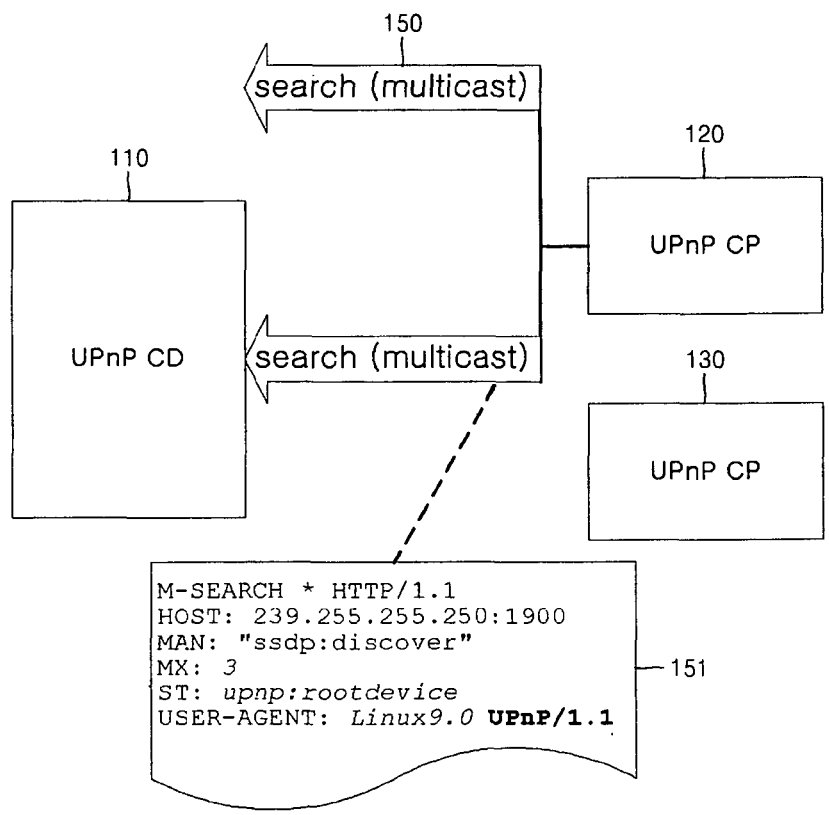
FIGS. 2A and 2B are views for explaining a conventional method used by a control point discovering a controlled device by using an M-Search message.
Figure 2B:
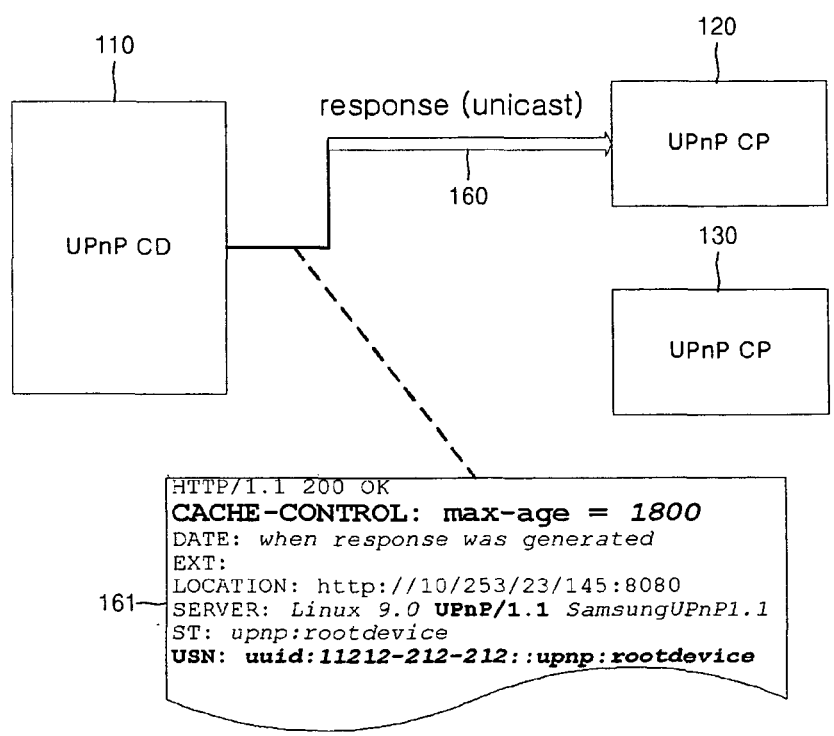
Figure 3:
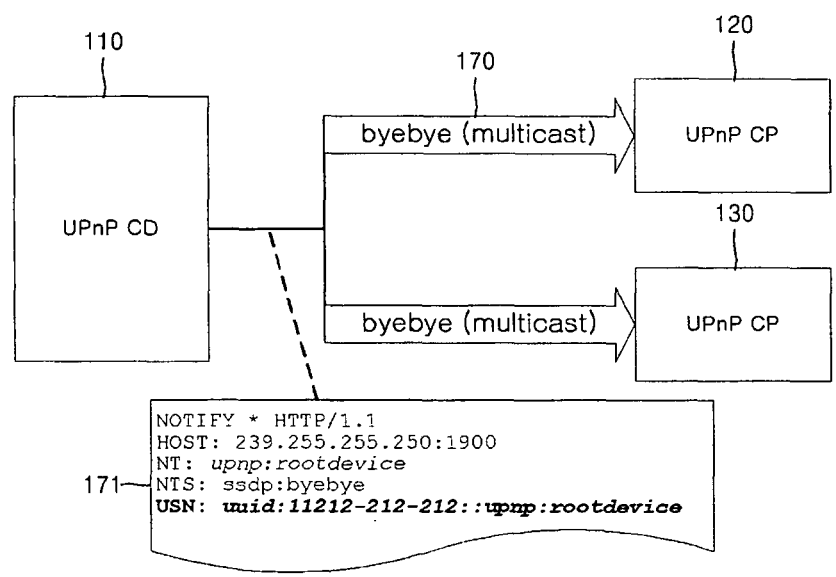
FIG. 3 is a view for explaining a method used by a controlled device to notify a control point that an operation thereof is terminated in an UPnP network by using a Byebye message, according to an exemplary embodiment of the present invention.
Figure 4:
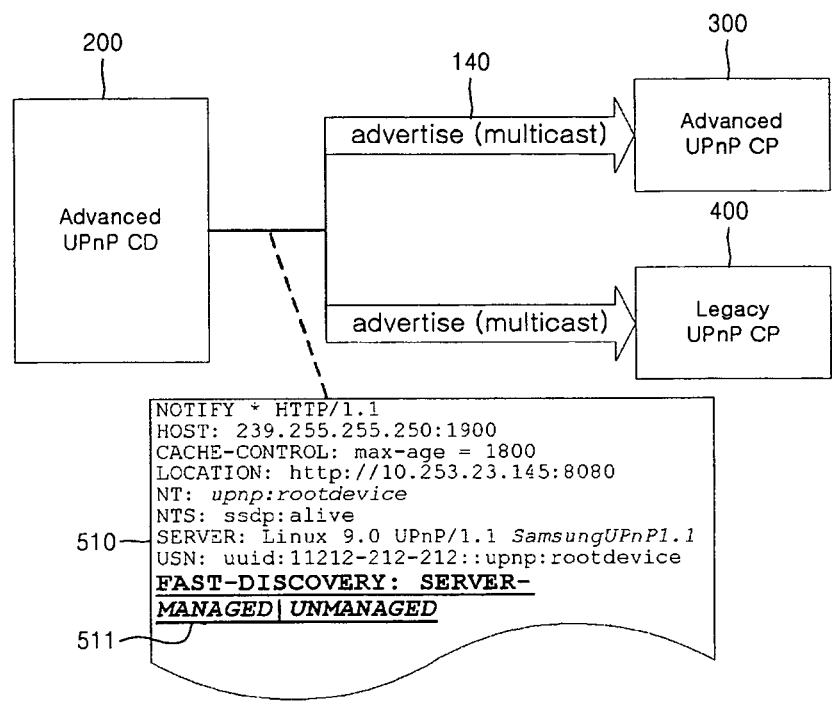
FIG. 4 is a view showing a structure of an SSDP notify message according to an exemplary embodiment of the present invention.

FIG. 4 is a view showing a structure of an SSDP notify message 510 according to an exemplary embodiment of the present invention.

As shown in FIG. 4, the SSDP notify message 510 according to the exemplary embodiment of the present invention is constructed by adding a new FAST-DISCOVERY header 511 to an existing SSDP notify message. Hereinafter, devices capable of processing the FAST-DISCOVERY header 511 are referred to as advanced devices, and the existing devices are referred to as legacy devices. The FAST-DISCOVERY header 511 includes a header value SERVER to notify that the controlled device transmitting the SSDP notify message 510 is an advanced controlled device 200. In addition, the FAST-DISCOVERY header 511 includes a header value MANAGE or UNMANAGED to notify whether or not the abnormal termination of the operation of the controlled device transmitting the SSDP notify message 510 is monitored by an advanced control point 300. Namely, the advanced control point 300 receiving the SSDP notify message 510 uses the FAST-DISCOVERY header 511 to be notified that the controlled device transmitting the message is the advanced controlled device 200 and that the controlled device is monitored by another advanced control point 300. Since the FAST-DISCOVERY header 511 is not defined in the UPnP standard, the existing control point 400 receiving the message neglects the FAST-DISCOVERY header 511.

Figure 5A:
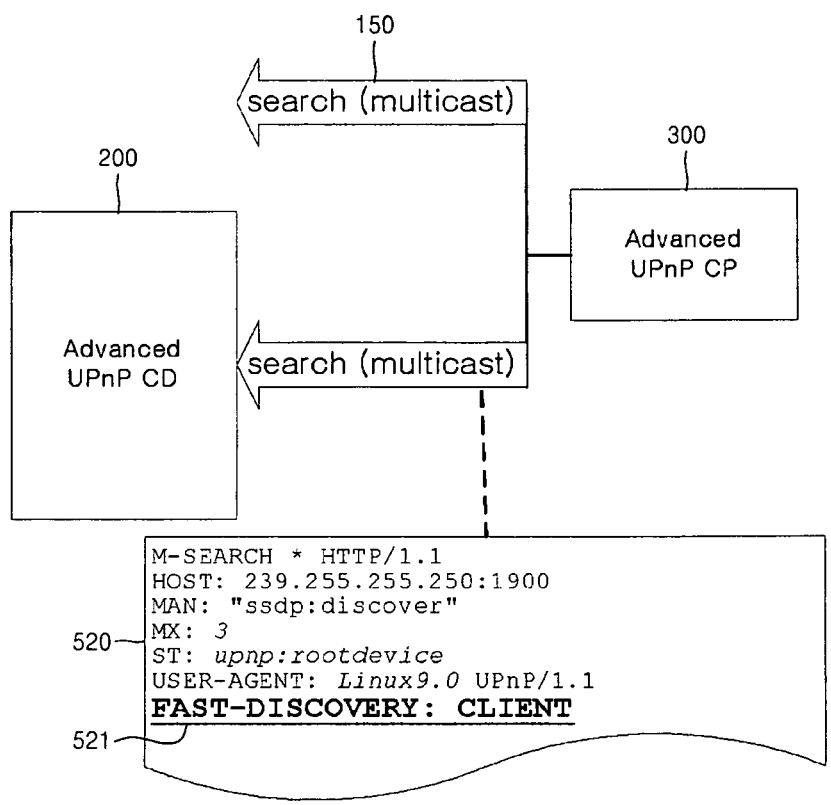
FIGS. 5A and 5B are views showing structures of an M-Search message and a response message thereto according to an exemplary embodiment of the present invention.
Figure 5B:
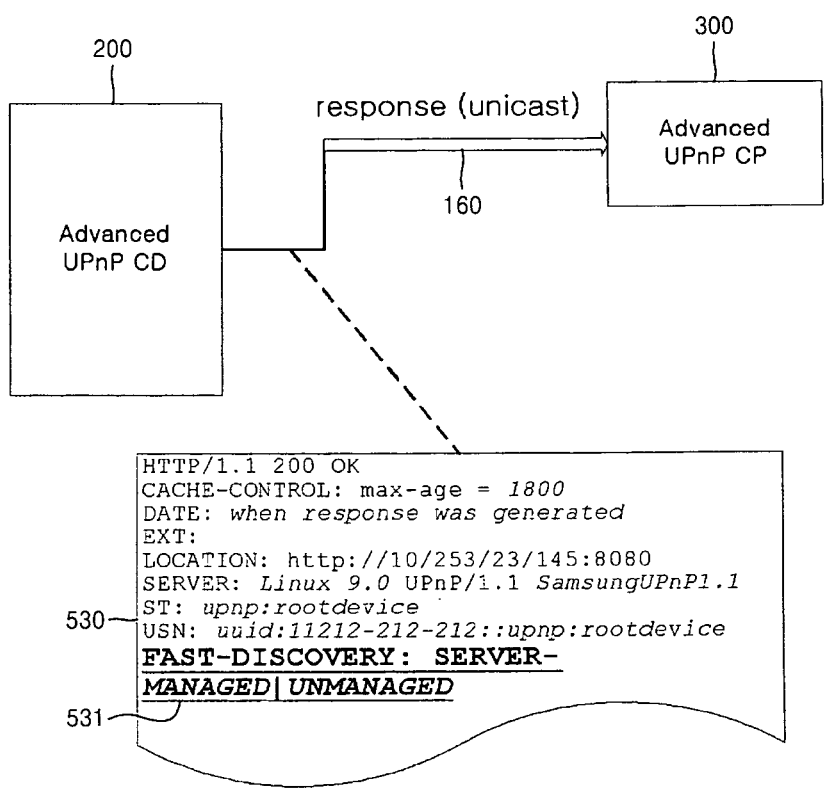

FIGS. 5A and 5B are views showing structures of an M-Search message and a response message thereto according to an exemplary embodiment of the present invention.

First, referring to FIG. 5A, an M-Search message 520 according to the present invention is constructed by adding a FAST-DISCOVERY header 521 to the existing M-Search message. The M-Search message 520 is transmitted by the Advanced control point 300. The FAST-DISCOVERY header 521 includes a header value CLIENT to indicate that the control point 300 transmitting the M-Search message is an Advanced control point.

Similarly, as shown in FIG. 5B, a Search response message 530 according to the present invention is constructed by adding a FAST-DISCOVERY header 531 to the existing Search response message. The Search response message 530 notifies an Advanced UPnP control point 300 transmitting the M-Search message 520 that the controlled device is the Advanced controlled device 200. In addition, the Search response message 530 includes a header value SERVER to indicate whether or not the controlled device is monitored by another Advanced control point.

The Advanced control point 300 receiving the Search response message 530 analyzes the FAST-DISCOVERY header 531 to check whether or not the abnormal termination operation of the associated controlled device is monitored by another Advanced control point.

Figure 6A:
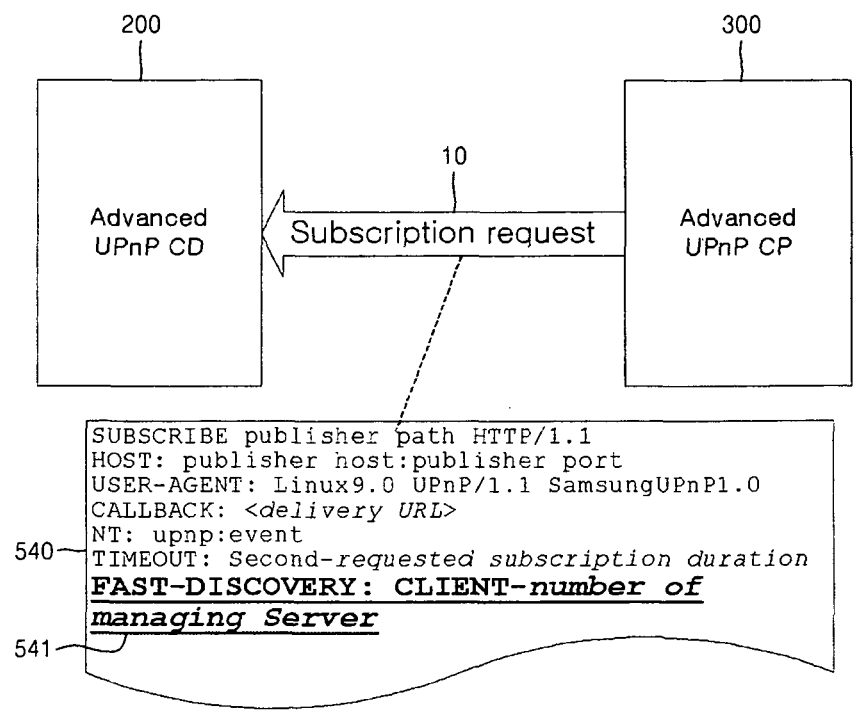
FIGS. 6A and 6B are views showing structures of a Subscription message and a response message thereto according to an exemplary embodiment of the present invention.
Figure 6B:
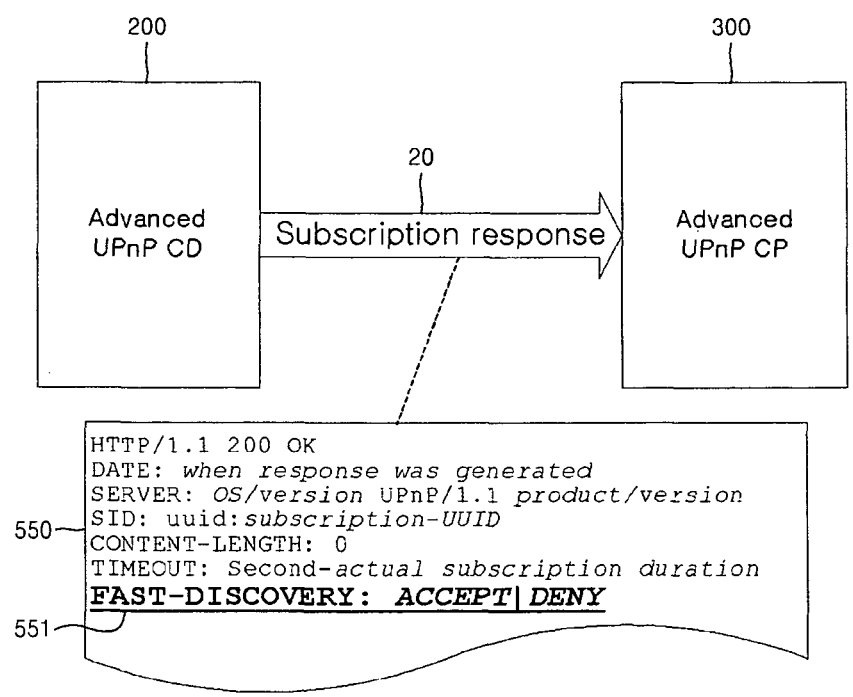

FIGS. 6A and 6B are views showing structures of a Subscription Request message (sometimes, referred to as a Subscription message) and a response message thereto according to an exemplary embodiment of the present invention.

As shown in FIG. 6A, a Subscription Request message 540 according to the present invention is constructed by adding a FAST-DISCOVERY header 541 to the existing Subscription Request message. When the Advanced control point 300 requests event subscription of the Advanced controlled device 200, the Advanced control point 300 uses the FAST-DISCOVERY header 541 to notify the controlled device of the number of the Advanced controlled devices 200 which the Advanced control point 300 monitors. Therefore, the controlled device selects the control point which is to monitor the abnormal termination operation of the controlled device with reference to the FAST-DISCOVERY header 541.

More specifically, the Advanced controlled device 200 selects the Advanced control point 300 having the lowest value of "number-of-managing-server" to monitor the abnormal termination operation of the Advanced controlled device 200. Thus, it is possible to solve the problem that the task of monitoring the abnormal termination operation of the Advanced controlled device 200 depends upon a specific Advanced control point.

An event registration request response message (sometimes, referred to as a Subscription response message) 550 according to the present invention is constructed by adding a FAST-DISCOVERY header 551 to the existing event registration request response message. The event registration request response message 550 is used to respond to the Subscription Request message 520 or a Subscription Renewal message 560 of the Advanced control point 300. The Advanced controlled device 200 uses the FAST-DISCOVERY header 551 to indicate whether or not it permits the Advanced control point 300 to monitor its abnormal termination operation.

The FAST-DISCOVERY header 551 has one of header values ACCEPT and DENY. When the Advanced controlled device 200 permits monitoring of its abnormal termination operation, the FAST-DISCOVERY header 551 has the header value ACCEPT. When the Advanced controlled device 200 does not permit monitoring of its abnormal termination operation, the FAST-DISCOVERY header 551 has the header value DENY. By doing so, only the selected one of several Advanced control points 300 can monitor the abnormal termination operation of the Advanced controlled device 200. For the selection, the header values "number-of-managing-server" of the FAST-DISCOVERY headers 541 and 561 can be used.

As shown in FIG. 6B, the event registration request response message (subscription response message) 550 is constructed by adding the FAST-DISCOVERY header 551 to the existing event registration request response message. The FAST-DISCOVERY header 551 represents acceptance or denial of the event registration request. The Advanced control point 300 receiving the event registration request response message 550 analyzes the FAST-DISCOVERY header 551. When the header value of the FAST-DISCOVERY header 551 is ACCEPT, the Advanced control point 300 keeps monitoring the abnormal termination operation of the Advanced controlled device 200. When the Advanced controlled device 200 abnormally terminates without transmitting a Byebye message 171, the Advanced control point 300 transmits the Byebye message 171 to other control points instead of the Advanced controlled device 200. When the header value of the FAST-DISCOVERY header 551 is DENY, the Advanced control point 300 does not monitor the abnormal termination operation of the Advanced controlled device 200.

Figure 7:
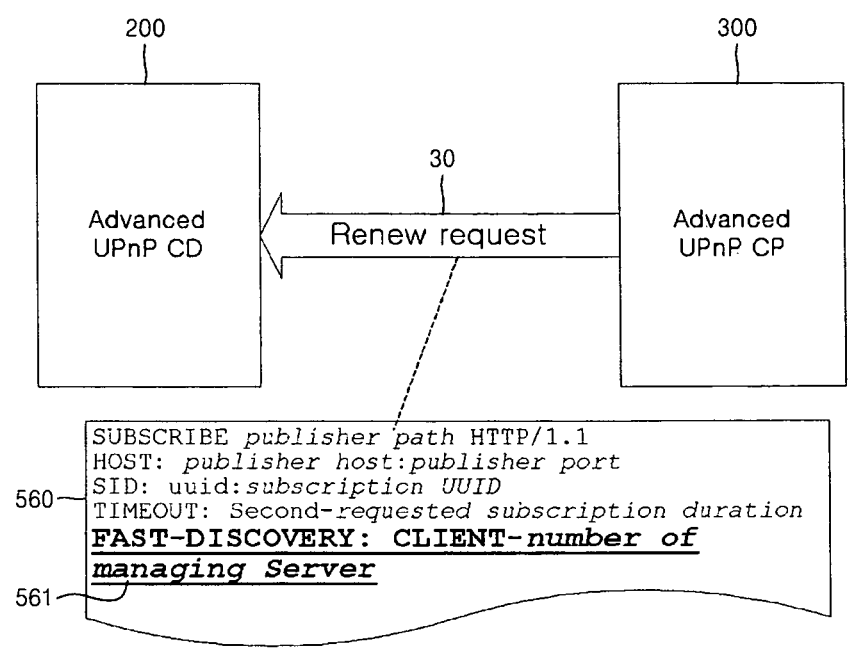
FIG. 7 is a view showing a structure of a Subscription Renewal message according to an exemplary embodiment of the present invention.

FIG. 7 is a view showing a structure of an event Subscription Renewal message (sometimes, referred to as a Subscription Renewal message) according to an exemplary embodiment of the present invention.

As shown in FIG. 7, the event Subscription Renewal message according to the present invention is constructed by adding the FAST-DISCOVERY header 561 to the existing event Subscription Renewal message. The event Subscription Renewal message is used for the Advanced control point 300 to request the Advanced controlled device 200 to update (or renew) the event registration (sometimes, referred to as Subscription). The FAST-DISCOVERY header 561 includes information on the number of Advanced controlled devices 200 which are monitored by the Advanced control point 300. The Advanced controlled device 200 can use the information to select the Advanced control point which is to monitor its abnormal termination operation.

FIG. 8 is a table 580 used for allowing a controlled device to manage information on control points which registers (or subscribes) an event of the controlled device according to an exemplary embodiment of the present invention.

As information stored in Legacy controlled devices, the table 580 includes "sid" items representing "uuid" values provided to permit Subscription to the control points, "callback" items representing a target location to which the Event message is transmitted, and "TimeOut" items 581 representing a transmission period when the control point transmits the event Subscription Renewal message. As information stored in only the Advanced control point according to the present invention, the table 590 includes "number-of-server" items 582 representing the number of controlled devices of which abnormal termination operation is monitored by the Advanced control point and "Manage" items 583 representing the Advanced control point which monitors the abnormal termination operation of the associated controlled device.

In the "number-of-server", items 582, the Legacy control point is represented by −1, and the Advanced control point 300 is represented by the number of the Advanced controlled devices of which abnormal termination operation is managed by the Advanced control point 300. As descried above, the Advanced controlled device 200 can select the Advanced control point 300 which monitors its abnormal termination operation with reference to the values of the items 582. In the exemplary embodiment of the present invention, the "Manage" items 583 of the control point CP3 is indicated by 1. Therefore, it can be understood that the associated controlled device permits the control point CP3 to monitor its abnormal termination operations. Preferably but not necessarily, when an operation of the control point CP3 is terminated, the controlled device selects the control point CP2 (no antecedent) which has the lowest value of the "number-of-server" items 582 as a control point which is to monitor its abnormal termination operation and sets the "Manage" items 583 of the control point CP2 to 1.

On the other hand, the controlled device uses the "TimeOut" items 581 to monitor the abnormal termination of the Advanced control point. For example, in a case where the control point CP3 monitoring the controlled device does not transmit the event Subscription Renewal message for three seconds, that is, a TimeOut value, the controlled device determines that the operation of the control point CP3 is abnormally terminated and transmits the SSDP notify message 510 in order to discover a new Advanced control point.

Figures 9, 10:
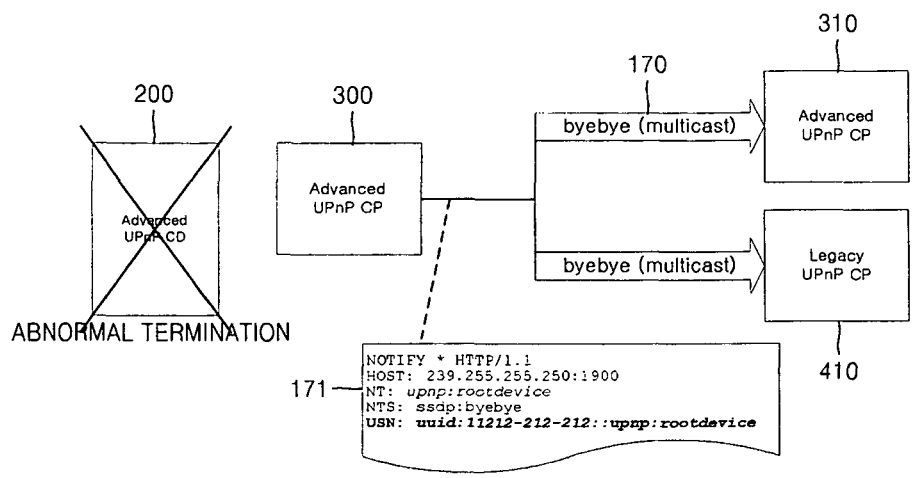
FIG. 9 is a table used for allowing a control point to manage information on a controlled device according to an exemplary embodiment of the present invention.
FIG. 10 is a conceptual view showing a method of transmitting a Byebye message according to an exemplary embodiment of the present invention.

FIG. 9 is a table 590 used for allowing a control point to manage information on a controlled device according to an exemplary embodiment of the present invention.

As times managed by the Legacy control point, the table 590 includes "uuid" items of a controlled device, "CACHE-CONTROL" times, and "effective time of Subscription" times. As times managed by only the Advanced control point according to the present invention, the table 590 includes "Advanced CD" items 591 representing an Advanced controlled device and "Manage" items 592 representing whether or not the abnormal termination operation of the controlled device is monitored by the Advanced controlled devices. When the control point detects the abnormal termination operation of the Advanced controlled device of which "Manage" items 592 is set to 1, the control point transmits the Byebye message 171 to all control points in the network to notify them that the operation of the associated controlled device is abnormally terminated.

FIG. 10 is a conceptual view showing a method of transmitting a Byebye message according to an exemplary embodiment of the present invention. As shown in FIG. 10, when an operation of the Advanced controlled device 200 is abnormally terminated, the Advanced control point 300 monitoring the abnormal termination operation transmits the Byebye message to all the control points 310 and 410 (irrespective of Advanced controlled device) instead of the associated Advanced controlled device 200.

Figure 11:
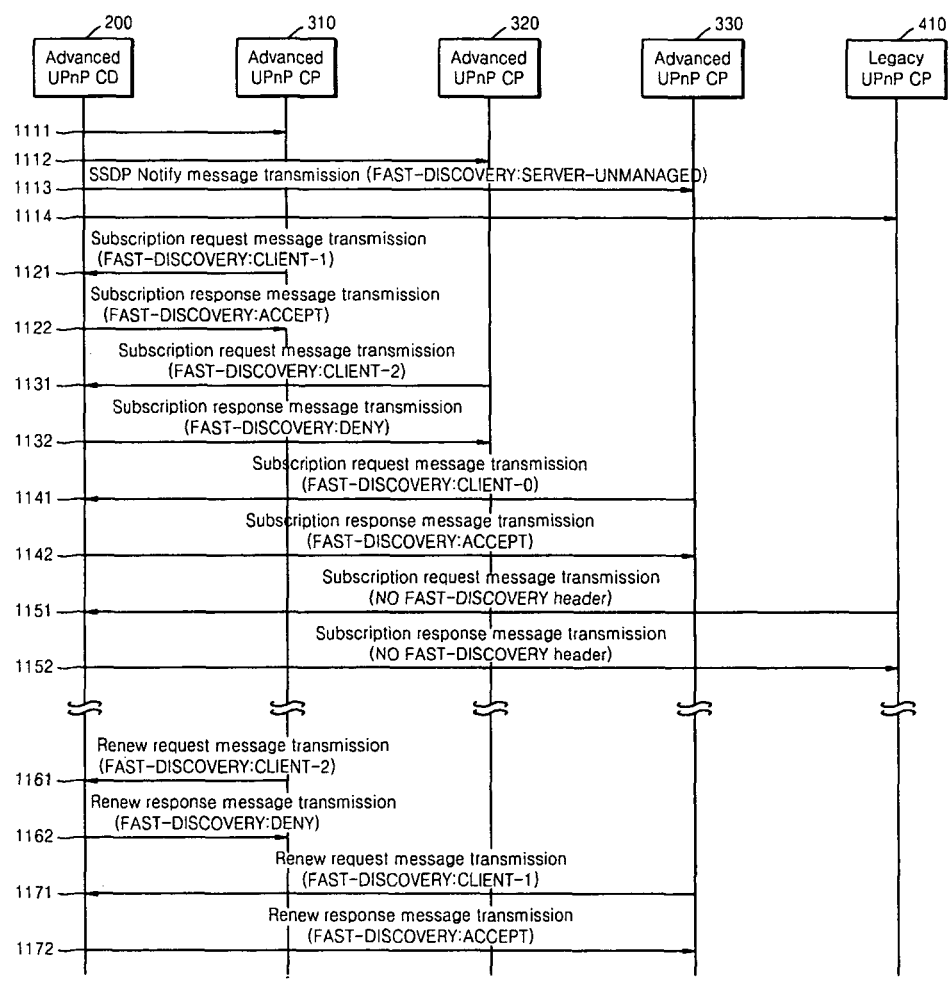
FIG. 11 is flowchart for explaining a procedure of selecting a control point when a controlled device is added to a UPnP network according to an exemplary embodiment of the present invention.

FIG. 11 is flowchart for explaining a procedure of selecting a control point when a controlled device is added to a UPnP network according to an exemplary embodiment of the present invention.

When an Advanced controlled device 200 is added to the network, notify messages 1111, 1112, 1113, and 1114 are transmitted to all the control points including the Advanced control points and the Legacy control points in the network. At this time, the notify message includes a FAST-DISCOVERY header indicating that the controlled device is an Advanced controlled device. Since the Advanced control point is not yet selected, the header value SERVER is set to UNMANAGED.

All the control points receiving the notify message transmit Subscription Request messages to the Advanced controlled device 200. At this time, each of the Advanced control points transmits the Subscription Request message with the FAST-DISCOVERY header including the number of the Advanced controlled devices which the Advanced control point manages. In this case, the Advanced controlled device 200 recognizes the Subscription Request message as a monitor permission request message according to the existence of the FAST-DISCOVERY header therein.

In the present exemplary embodiment, it is assumed that first, second, and third Advanced control points 310, 320, and 330 monitor the abnormal termination operation of one, two, and no controlled devices, respectively.

Since the first Advanced control point 310 monitors the abnormal termination of one Advanced controlled device, the first Advanced control point 310 transmits an Subscription Request message 1121 with FAST-DISCOVERY header having the header value "1". At this time, since there is no Advanced control point managing the Advanced controlled device 200, the Advanced controlled device 200 transmits the event registration request response message 1122 with FAST-DISCOVERY header having the header value "ACCEPT" to the first Advanced control point 310 in order to permit the first Advanced control point 310 to monitor it. Accordingly, the first Advanced control point 310 monitors the abnormal termination operation of the Advanced controlled device 200.

Since the second Advanced control point 320 monitors the abnormal termination operation of two Advanced controlled devices, the second Advanced control point 320 transmits an Subscription Request message 1131 with FAST-DISCOVERY header having the header value "2". At this time, since the header value of the FAST-DISCOVERY header transmitted by the second Advanced control point 320 is larger than the header value of the FAST-DISCOVERY header transmitted by the first Advanced control point 310, the Advanced controlled device 200 receiving the Subscription Request message 1131 transmits the event registration request response message 1132 with FAST-DISCOVERY header having the header value "DENY" to the second Advanced control point 320. The second Advanced control point 320 receiving the event registration request response message 1132 does not participate in monitoring the abnormal termination of the associated Advanced controlled device 200.

Since the third Advanced control point 330 does not monitor an Advanced controlled device at this time, the third Advanced control point 330 transmits an Subscription Request message 1141 with FAST-DISCOVERY header having the header value "0". At this time, since the number of the controlled devices monitored by the third Advanced control point 330 is smaller than the number of the controlled devices monitored by the first Advanced control point 310 which currently monitors the Advanced controlled device 200, the Advanced controlled device 200 receiving the Subscription Request message 1141 transmits the event registration request response message 1142 with FAST-DISCOVERY header having the header value "ACCEPT" to the third Advanced control point 330. From this time, the third Advanced control point 330 receiving the event registration request response message 1142 monitors the abnormal termination operation of the associated Advanced controlled device 200.

As a result, the two Advanced control points 310 and 330 monitor the abnormal termination operation of the associated Advanced controlled device 200.

However, since it is preferable but not necessary that only one controlled device be monitored by only one control point in order to reduce loads on the network, only the third Advanced control point 330 having the smaller header value "number-of-managing-server" must be selected, and the other control point, that is, the first Advanced control point 310, must be notified not to monitor the abnormal termination operation. The procedure is performed by processing event Subscription Renewal messages 1161 and 1171, which are described later. Namely, from this time, in response to the event Subscription Renewal message transmitted by the first Advanced control point 310, the Advanced controlled device 200 transmits a response message with FAST-DISCOVERY header having the header value "DENY" to the first Advanced control point 310.

However, the Advanced controlled device 200 receiving the event registration update 1171 transmitted by the third Advanced control point 330 transmits an event registration update response message 1172 with the FAST-DISCOVERY header having the header value of "ACCEPT" to the third Advanced control point 330 in order to permit the third Advanced control point 330 to keep monitoring the abnormal termination operation of the associated Advanced controlled device 200.

As a result, only one Advanced control point, that is, the third Advanced control point 330, monitors the abnormal termination operation of the associated Advanced controlled device 200.

On the other hand, an event registration request procedure of the Legacy control point 410 is performed with the existing messages 1151 and 1161 without the FAST-DISCOVERY headers.

Figure 12:
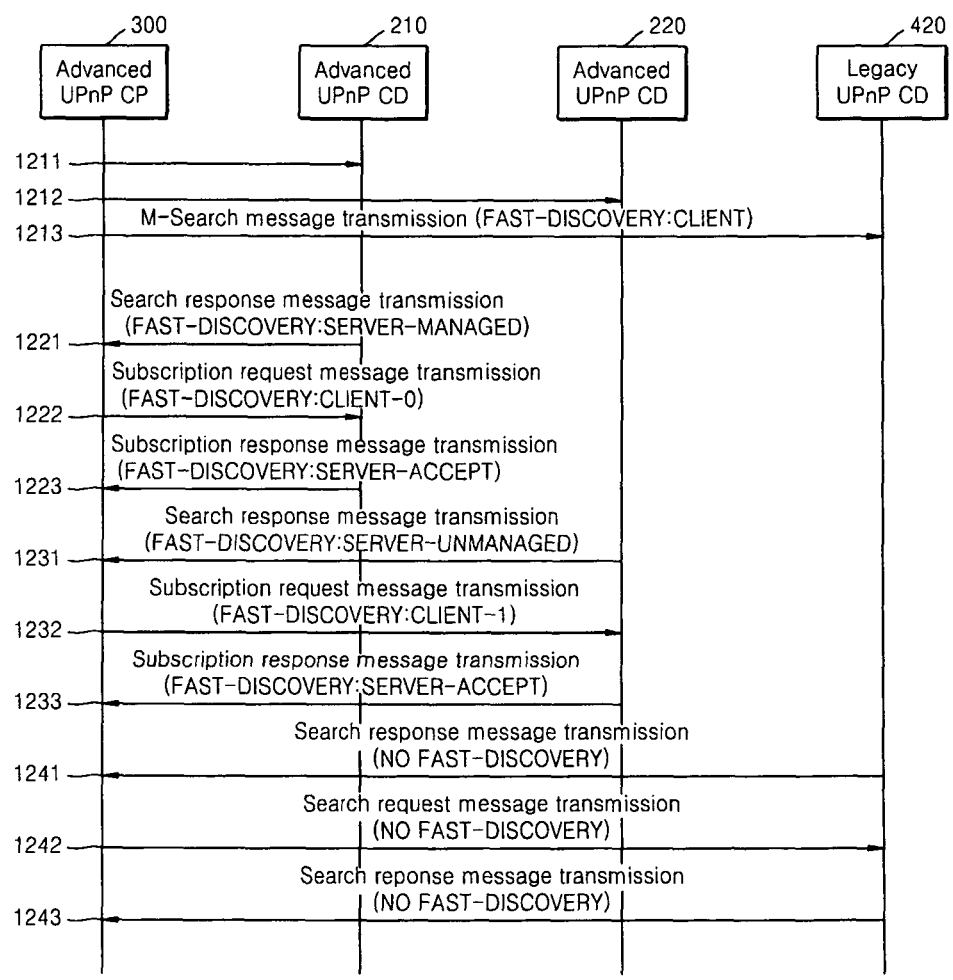
FIG. 12 is a flowchart for explaining a procedure of determining a controlled device of which abnormal termination of an operation is to be monitored when the control unit is added to an UPnP network, according to an exemplary embodiment of the present invention.

FIG. 12 is a flowchart for explaining a procedure of determining a controlled device of which abnormal termination operation is to be monitored when the control unit is added to a UPnP network.

The Advanced control point 300 transmits M-Search messages 1211, 1212, and 1213 to all the controlled devices. At this time, the Advanced control point 300 adds the FAST-DISCOVERY header to the M-Search message to notify that the Advanced control point 300 is an Advanced control point. The controlled devices receiving the message transmit response messages 1221, 1231, and 1241 to the Advanced control point 300. The Advanced control point 300 receiving the response messages transmitted by the Advanced controlled devices 210 and 220 transmits Subscription Request messages 1222 and 1232. At this time, the Advanced control point 300 uses the FAST-DISCOVERY header of the Subscription Request message to notify the number of Advanced controlled devices which are currently monitored by the Advanced control point 300.

In the present exemplary embodiment, it can be understood that, since the Advanced control point 300 acquires permission from the first and second controlled devices 210 and 220, the Advanced control point 300 can monitor the abnormal termination operation of two Advanced controlled devices. On the other hand, communication with the Legacy controlled device 420 can be normally performed by exchanging the messages having no FAST-DISCOVERY headers as defined in the existing UPnP standard.

Figure 13:
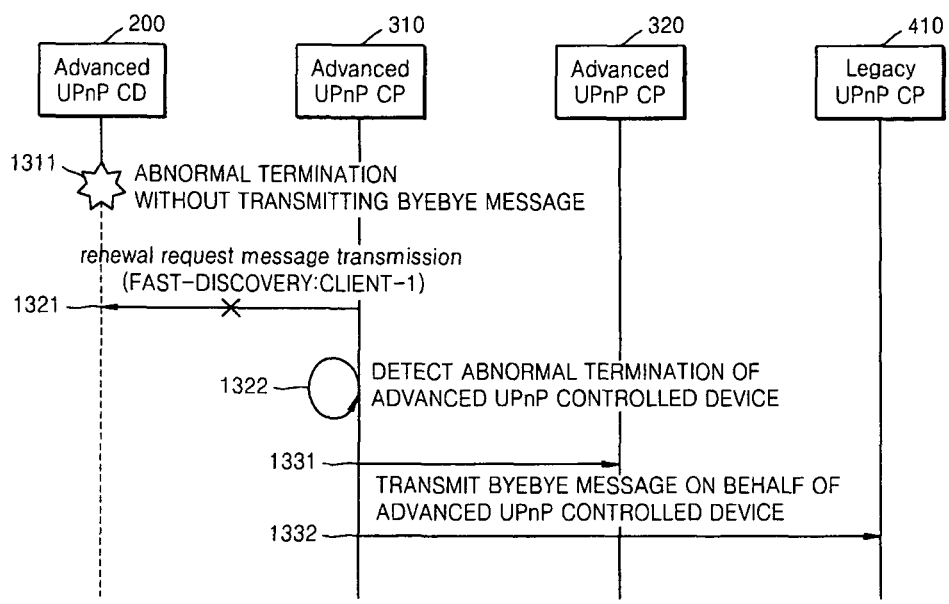
FIG. 13 is a flowchart for explaining a procedure of a control point transmitting a Byebye message when an operation of a controlled device is abnormally terminated according to an exemplary embodiment of the present invention.

FIG. 13 is a flowchart for explaining a procedure of a control point transmitting a Byebye message when an operation of a controlled device is abnormally terminated according to an exemplary embodiment of the present invention.

In the present exemplary embodiment, it is assumed that, when an operation of the Advanced controlled device 200 is abnormally terminated without transmitting a Byebye message (1331), an Advanced control point 310 monitoring the abnormal termination operation of the associated Advanced controlled device 200 transmits an event Subscription Renewal message 1321 to the Advanced controlled device 200 before the "TimeOut" time period for the event registration (Subscription) elapses, and the Advanced controlled device 200 transmits no response thereto. In this case, it is considered that the operation of the Advanced controlled device 200 is abnormally terminated (1322), and the Advanced control point 310 transmits the Byebye messages 1331 and 1332 to all the control points 320 and 330 instead of the Advanced controlled device 200 to notify them of the abnormal termination operation of the associated Advanced controlled device 200.

Figure 14:
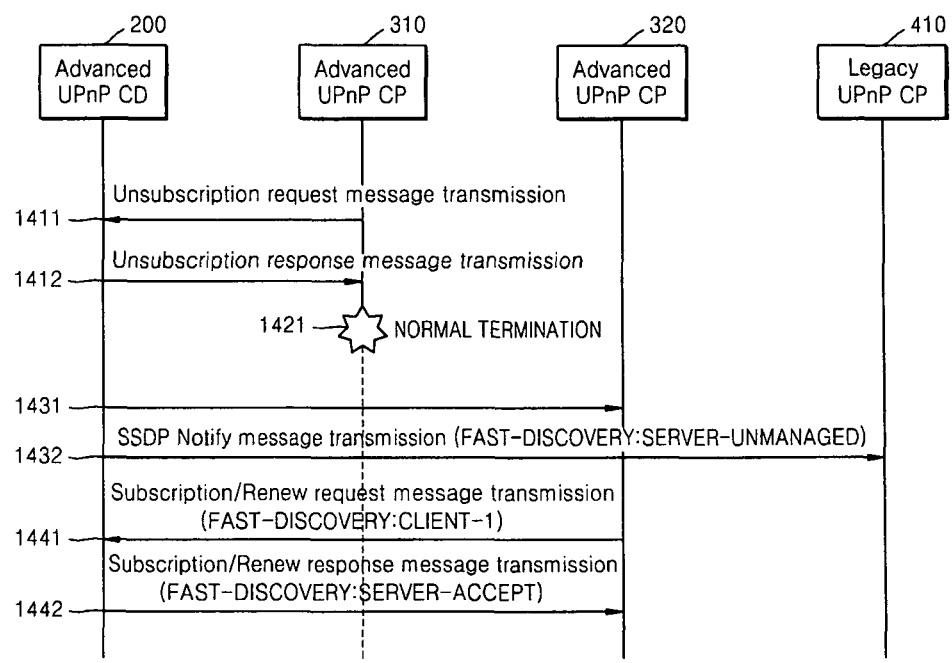
FIG. 14 is a flowchart for explaining a procedure used by a controlled device selecting other control point than a control point that transmits an Unsubscription message to the controlled device according to exemplary an embodiment of the present invention.

FIG. 14 is a flowchart for explaining a procedure of a controlled device selecting another control point than a control point that transmits an event registration release message (sometimes, referred to as an Unsubscription message) to the controlled device according to an exemplary embodiment of the present invention.

When the Advanced control point 310 monitoring the abnormal termination operation of the associated Advanced controlled device 200 transmits an event registration release (Unsubscription) message 1411 to the Advanced controlled device 200, the Advanced controlled device 200 transmits SSDP notify messages 1431 and 1432 in order to discover a new Advanced control point. Another Advanced control point 320 receiving the messages uses the Subscription Request message or the Subscription Renewal message 1441 to request monitoring of the abnormal termination operation of the associated Advanced controlled device 200. The Advanced controlled device 200 transmits a response message 1442 with FAST-DISCOVERY header having the header value "ACCEPT" to the Advanced control point 320 in order to permit the Advanced control point 320 to monitor it.

Figure 15:
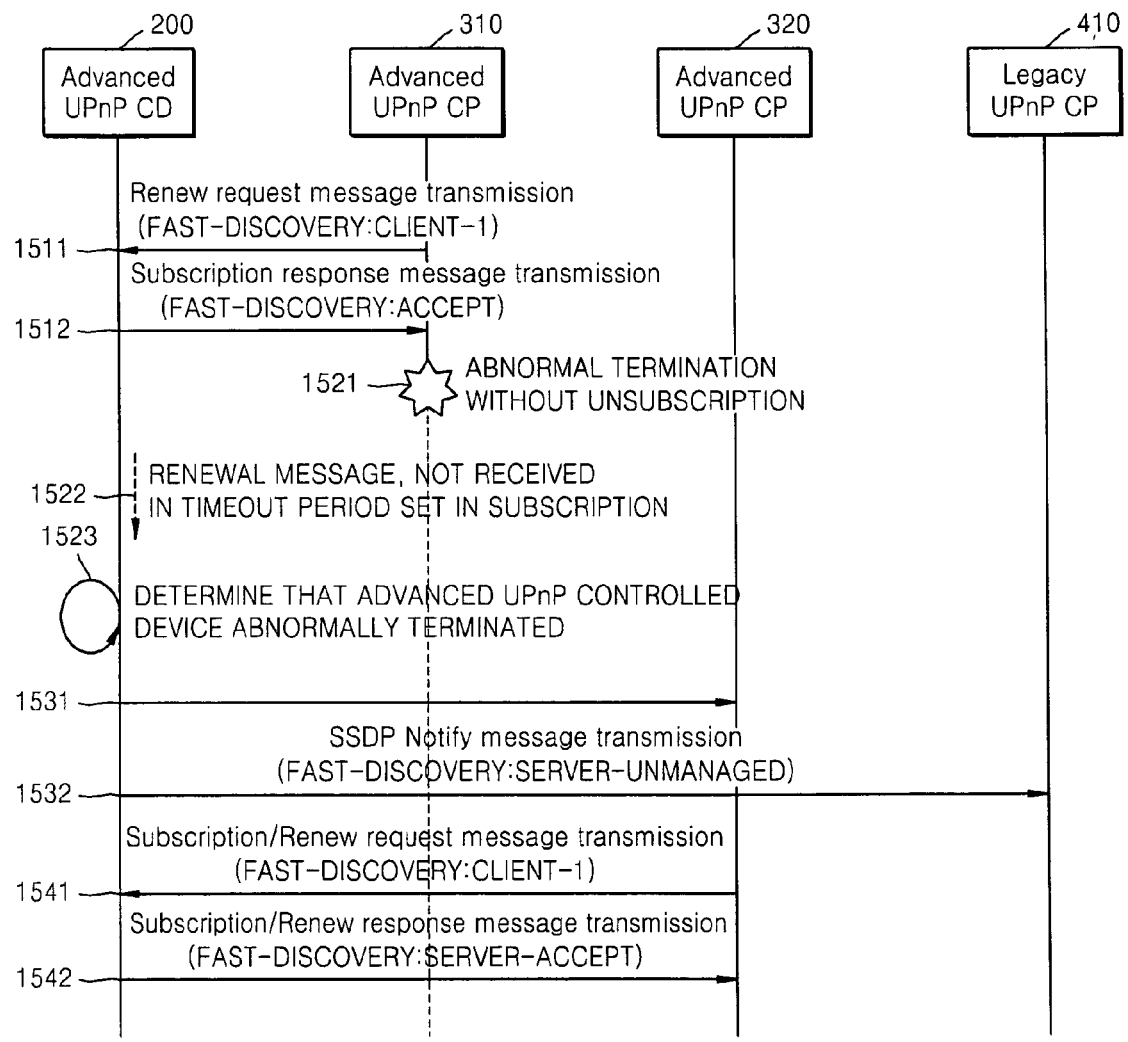
FIG. 15 is a flowchart for explaining a procedure used by a controlled device selecting other control points excluding a control point of which operation is abnormally terminated according to an exemplary embodiment of the present invention.

FIG. 15 is flowchart for explaining a procedure of a controlled device selecting another control point excluding a control point of which operation is abnormally terminated according to an exemplary embodiment of the present invention.

When an operation of the Advanced control point 310 monitoring the Advanced controlled device 200 is abnormally terminated without transmitting the event registration release message, the Advanced controlled device 200 cannot receive the event Subscription Renewal message from the control point 310 monitoring the Advanced controlled device 200 until the "TimeOut" time period elapses. In this case, the Advanced controlled device 200 considers that the operation of the Advanced control point 310 monitoring the Advanced controlled device 200 is abnormally terminated (1532) and discovers a new Advanced control point.

Figure 16:
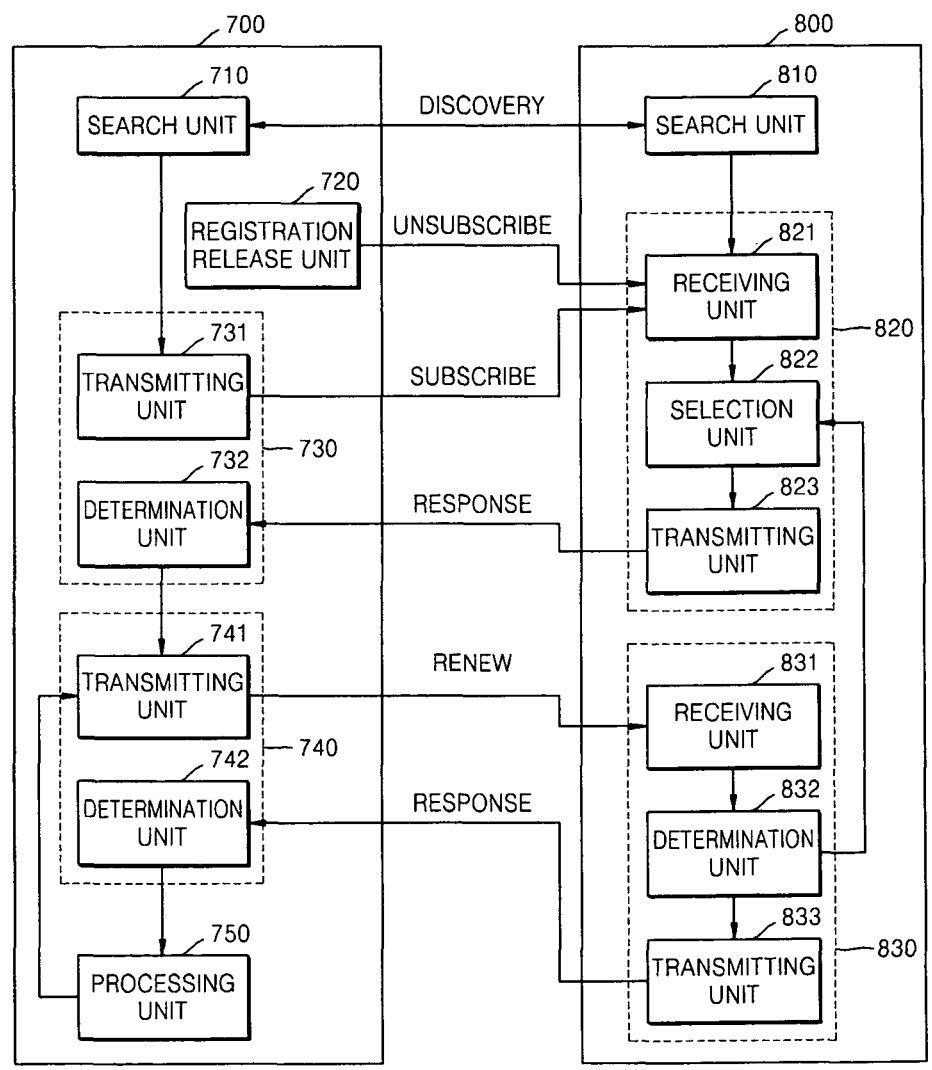
FIG. 16 is a view showing constructions of a control point and a controlled device according to an embodiment of the present invention.

FIG. 16 is a view showing constructions of a control point and a controlled device according to an exemplary embodiment of the present invention.

As shown in FIG. 16, a control point 700 according to the exemplary embodiment of the present invention includes a search unit 710, a registration release unit 720, a monitoring determination unit 730, a monitoring unit 740, and a processing unit 750. The monitoring determination unit 730 includes a transmitting unit 731 and a determination unit 732. The monitoring unit 740 includes a transmitting unit 741 and a determination unit 742.

First, in the control point 700, the search unit 710 exchanges SSDP notify messages, M-Search messages, or other Discovery messages of the UPnP standard with a search unit 810 of the controlled device. As described above, according to the present invention, the Discovery messages include a FAST-DISCOVERY header indicating that the controlled device is an Advanced device.

The transmitting unit 731 transmits a Subscription Request message with a FAST-DISCOVERY header including a monitoring permission request message to the controlled devices. In order to reduce loads on the network, the message with the FAST-DISCOVERY header is transmitted only to the controlled devices which the search unit 710 considers to be capable of analyzing the monitoring permission request message by using the Discovery message. In addition, information on the number of controlled devices which are currently monitored is included in the transmitted FAST-DISCOVERY header, so that the controlled device 800 can determine whether or not to permit its monitoring with reference to the information.

The determination unit 732 selects the controlled device which transmits a response message to the Subscription Request message with a FAST-DISCOVERY header including an ACCEPT message for permitting its monitoring as a controlled device to be monitored.

The monitoring unit 740 periodically determines whether or not an operation of the controlled device 800 selected as a controlled device to be monitored device is terminated by using an Event message. The monitoring unit 740 periodically transmits to the controlled device 800 a Subscription Renewal message (Subscription Renewal message) with a FAST-DISCOVERY header including the information of the number of controlled devices which are currently being monitored.

If there is not a response of the controlled device 800 to the Subscription Renewal message, the determination unit 742 determines that the operation of the controlled device 800 is terminated without transmitting the Byebye message. If there is a response, the determination unit 742 determines that the operation of the controlled device 900 is not terminated.

When it is determined that the operation of the controlled device 800 is terminated without transmitting the Byebye message as a result of the determination of the determination unit 742, the processing unit 750 multicasts the Byebye message over the network instead of the controlled device 800. When it is determined that the operation of the controlled device 800 is not terminated, the processing unit 750 determines whether or not to keep on monitoring the controlled device 800 with reference to the response message. When the header value of the FAST-DISCOVERY header of the response message is ACCEPT, the processing unit 750 inserts the FAST-DISCOVERY header into the next-transmitted update registration message so as to request monitoring update of the controlled device 800. When the header value of the FAST-DISCOVERY header of the response message is DENY, the processing unit 750 does not insert the FAST- DISCOVERY header into the next-transmitted update registration message, so that the controlled device 800 is not monitored.

When the operation of the control point 700 is terminated, the registration release unit 720 transmits a registration release message (unsubscription message) to the controlled device 800 of which event is registered by the control point 700.

On the other hand, according to an exemplary embodiment of the present invention, the controlled device 800 includes a search unit 810, a control point selection unit 820, and an update determination unit 830. The control point selection unit 820 includes a receiving unit 821, a selection unit 822, and a transmitting unit 823. The update determination unit 830 includes a receiving unit 831, a determination unit 832, and a transmitting unit 833.

The control point selection unit 820 uses the Subscription Request message to select a control point 700 which is to monitor the abnormal termination operation of the controlled device 800. If a registration releaser message of the selected control point 700 is received, or if the selected control point 700 does not transmit a Subscription Renewal message for the TimeOut time period, the control point selection unit 820 determines that the control point 700 which is to monitor the controlled device 800 is disconnected from the network and tries to select another control point.

The control point selection unit 820 includes a receiving unit 821 which receives the Subscription Request message from the control point 700, a selection unit 822 which determines whether or not to allow the control point 700 to monitor the abnormal termination operation of the controlled device 800 with reference to the information included in the FAST-DISCOVERY header of the Subscription Request message, and a transmitting unit 823 which transmits a response message to the Subscription Request message with a FAST-DISCOVERY header including a selection message. Here, as described above, the information included in the FAST-DISCOVERY header of the Subscription Request message may be the number of controlled devices which are currently being monitored by the control point 700.

The update determination unit 830 includes a receiving unit 831, a determination unit 832 and a transmitting unit 833. The receiving unit 831 receives the Subscription Renewal message which is periodically transmitted by the control point 700 selected by the selection unit 822 of the control point selection unit 820 and uses the Subscription Renewal message to determine whether or not to update the Subscription and receives the Subscription Renewal message from the selected control point 700. The determination unit 832 determines whether or not to allow the selected control point 700 to keep monitoring the abnormal termination operation with reference to the information included in the FAST-DISCOVERY header of the Subscription Renewal message. The transmitting unit 833 transmits a response message to the Subscription Renewal message with a FAST-DISCOVERY header including the determination message to the selected control point 700.

As described above, the information included in the FAST-DISCOVERY header of the Subscription Renewal message may be the number of the controlled devices which are currently monitored by the selected control point 700.

The exemplary embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), and storage media.

Additionally, exemplary embodiments of the present invention can be written as computer programs and can be implemented in general-use digital computers that execute the programs via recorded media using carrier waves (e.g., transmission through the Internet).

According to the present invention, a control point uses a message defined in the UPnP standard to monitor an abnormal termination operation of a controlled device, so that it is possible to speedily notify all the control points in a network that the operation of the controlled device is abnormally terminated without increasing the load on the network and creating a compatibility problem with the existing UPnP devices.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in the descriptive sense only and not for purposes of limitation. Therefore, the scope of the invention is defined not by the detailed description of the invention but by the appended claims, and all differences within the scope will be construed as being included in the present invention.

What is claimed is:

1. A method of notifying termination of an operation of a controlled device of a UPnP network, comprising:
   (a) selecting, by a control point, at least one of a plurality of controlled devices in the network as a selected controlled device to be monitored whether or not an operation of the selected controlled device is terminated without notification;
   (b) periodically determining whether or not the operation of the selected controlled device is terminated by using an Event message; and
   (c) selectively notifying the network of the termination of the operation of the selected controlled device based on a result of the determination,
   wherein the at least one of a plurality of controlled devices is selected based on header information of a message transmitted by the selected at least one of a plurality of controlled devices and the header information includes a value permitting monitoring of the selected at least one of a plurality of controlled devices during an abnormal termination of the selected at least one of a plurality of controlled devices.

2. The method of claim 1, wherein (a) comprises:
   (a1) transmitting a Subscription Request message with a header including a monitoring permission request message to at least one of the controlled devices; and
   (a2) selecting as the selected controlled device to be monitored a controlled device transmitting a response message to the Subscription Request message with a header including a monitoring permission message.

3. The method of claim 2, wherein, in (a1), the Subscription Request message is transmitted only to those of the plurality of controlled devices which are determined to be capable of analyzing the monitoring permission request message by using a Discovery message.

4. The method of claim 2, wherein, in (a1), the Subscription Request message with a header including information on a number of controlled devices which are currently being monitored is transmitted, so that a controlled device receiving the Subscription Request message can determine whether or not to permit its monitoring with reference to the information.

5. The method of claim 1, wherein (b) comprises:
    (b1) periodically transmitting a Subscription Renewal message to the selected controlled device; and
    (b2) determining that the operation of the selected controlled device transmitting no response to the Subscription Renewal message is terminated without transmitting a Byebye message, and
    wherein (c) comprises multicasting the Byebye message over the network on behalf of the selected controlled device when the operation of the selected controlled device is terminated without transmitting the Byebye.

6. The method of claim 1, wherein (b) comprises:
    (b1) periodically transmitting a Subscription Renewal message with a header including a monitoring update request message to the selected controlled device; and
    (b2) determining that the operation of the selected controlled device transmitting a response message to the Subscription Renewal message is not terminated, and
    wherein (c) comprises determining whether or not to keep monitoring the selected controlled device of which operation is determined not to be terminated with reference to the response message.

7. The method of claim 6, wherein, in (c), if the header of the response message includes a monitoring update permission message, a header of the next-transmitted Subscription Renewal message includes a monitoring update request message, and if the header of the response message includes a monitoring update denial message, a header of the next-transmitted Subscription Renewal message does not include the monitoring update request message.

8. The method of claim 6, wherein, in (b1), the Subscription Renewal message with a header including information on a number of controlled devices which are currently being monitored is transmitted, so that the selected controlled device can determine whether or not to permit its monitoring with reference to the information.

9. A non-transitory computer readable recording medium having embodied thereon a computer program for executing a method of notifying termination of an operation of a controlled device of a UPnP network, the method comprising:
    selecting, by a control point, at least one of a plurality of controlled devices in the network as a selected controlled device to be monitored whether or not an operation of the selected controlled device is terminated without notification;
    periodically determining whether or not the operation of the selected controlled device is terminated by using an Event message; and
    selectively notifying the network of the termination of the operation of the selected controlled device based on the determination,
    wherein the at least one of a plurality of controlled devices is selected based on header information of the selected at least one of a plurality of controlled devices and the header information of a message transmitted by the selected at least one of a plurality of controlled devices includes a value permitting monitoring during an abnormal termination of the selected at least one of a plurality of controlled devices.

10. An apparatus for notifying termination of an operation of a controlled device on a UPnP network, comprising:
    a monitoring determination unit implemented in hardware which selects at least one of a plurality of controlled devices in the network as a selected controlled device to be monitored in order to monitor whether or not an operation of the selected controlled device is terminated without notification;
    a monitoring unit which periodically determines whether or not the operation of the selected controlled device is terminated by using an Event message; and
    a processing unit which selectively notifies the network of the termination of the operation of the selected controlled device based on a result of the determination,
    wherein the at least one of a plurality of controlled devices is selected based on header information of the at least one of a plurality of controlled devices and the header information of a message transmitted by the selected at least one of a plurality of controlled devices includes a value permitting monitoring during an abnormal termination of the selected at least one of a plurality of controlled devices.

11. The apparatus of claim 10, wherein the monitoring determination unit comprises:
    a transmitting unit which transmits a Subscription Request message with a header including a monitoring permission request message to at least one of the plurality of controlled devices; and
    a determination unit which selects, as the selected controlled device to be monitored, a controlled device transmitting a response message to the Subscription Request message with a header including a monitoring permission message.

12. The apparatus of claim 11, wherein the transmitting unit transmits the Subscription Request message only to those of the plurality of controlled devices which are determined to be capable of analyzing the monitoring permission request message by using a Discovery message.

13. The apparatus of claim 11, wherein the transmitting unit transmits the Subscription Request message with a header including information on a number of controlled devices which are currently being monitored, so that a controlled device receiving the Subscription Request message can determine whether or not to permit its monitoring thereof with reference to the information.

14. The apparatus of claim 10, wherein the monitoring unit comprises:
    a transmitting unit which periodically transmits a Subscription Renewal message to the selected controlled device; and
    a determination unit which determines that the operation of the selected controlled device transmitting no response to the Subscription Renewal message is terminated without transmitting a Byebye message, and
    wherein the processing unit multicasts the Byebye message over the network on behalf of the selected controlled device when the operation of the selected controlled device is terminated without transmitting the Byebye message.

15. The apparatus of claim 10, wherein the monitoring unit comprises:
    a transmitting unit which periodically transmits a Subscription Renewal message with a header including a monitoring update request message to the selected controlled device; and
    a determination unit which determines that the operation of the selected controlled device transmitting a response message to the Subscription Renewal message is not terminated, and
    wherein the processing unit determines whether or not to keep monitoring the selected controlled device of which operation is determined not to be terminated by the determination unit with reference to the response message.

16. The apparatus of claim 15, wherein if the header of the response message includes a monitoring update permission message, the processing unit inserts a monitoring update request message into a header of the next-transmitted Subscription Renewal message, and if the header of the response message includes a monitoring update denial message, the processing unit does not insert the monitoring update request message into a header of the next-transmitted Subscription Renewal message.

17. The apparatus of claim 15, wherein the transmitting unit transmits the Subscription Renewal message with a header including information on a number of controlled devices which are currently being monitored, so that selected controlled device can determine whether or not to permit its monitoring with reference to the information.

18. A method of determining a control point for transmitting a Byebye message in a UPnP network when an operation of a controlled device is abnormally terminated, comprising:
(a) selecting at least one control point by using a Subscription Request message; and
(b) determining whether or not to update the Subscription by using a Subscription Renewal message periodically transmitted by the selected control point,
wherein the selected control point multicasts the Byebye message over the network when the operation of the controlled device is abnormally terminated without transmitting the Byebye message,
wherein the at least one control point is selected based on header information of a message transmitted by the at least one control point and the header information identifies a number of controlled devices which the at least one control point monitors and header information of a response message, transmitted by the controlled device as a response of the message transmitted by the at least one control point, includes a value permitting monitoring of the controlled device during the abnormal termination of the controlled device.

19. The method of claim 18, further comprising (c) selecting another control point excluding the selected control point of (a) if a registration release message from the selected control point is received or if a next Subscription Renewal message is not received for a predetermined time period after the Subscription Renewal message is received.

20. The method of claim 18, wherein (a) comprises:
(a1) receiving at least one Subscription Request message;
(a2) selecting the selected control point which is to transmit the Byebye message instead of the controlled device with reference to information included in a header of the received Subscription Request message; and
(a3) transmitting a response message to the Subscription Request message with a header including a selection-associated message, and
wherein the information in the header is a number of controlled devices to which the control point transmitting the Subscription Request message is to transmit the Byebye message.

21. The method of claim 18, wherein (b) comprises:
(b1) receiving the Subscription Renewal message from the selected control point;
(b2) determining whether or not to allow the selected control point to keep transmitting the Byebye message instead of the controlled device with reference to information included in a header of the received Subscription Renewal message; and
(b3) transmitting a message in response to the Subscription Renewal message with a header including a determination-associated message to the selected control point, and
wherein the information in the header is a number of controlled devices to which the selected control point is to transmit the Byebye message.

22. A non-transitory computer readable recording medium having embodied thereon a computer program for executing a method of determining a control point for transmitting a Byebye message in a UPnP network when an operation of a controlled device is abnormally terminated, the method comprising:
selecting at least one control point by using a Subscription Request message; and
determining whether or not to update the Subscription by using a Subscription Renewal message periodically transmitted by the selected control point,
wherein the selected control point multicasts the Byebye message over the network when the operation of the controlled device is abnormally terminated without transmitting the Byebye message,
wherein the at least one control point is selected based on header information of the at least one control point and the header information of a message transmitted by the selected at least one control point identifies a number of controlled devices which the at least one control point monitors and header information of a response message, transmitted by the controlled device as a response of the message transmitted by the at least one control point, includes a value permitting monitoring of the controlled device during the abnormal termination of the controlled device.

23. A controlled device in a UPnP network, comprising:
a control point selection unit implemented in hardware which selects at least one control point by using a Subscription Request message; and
an update determination unit which determines whether or not to update the Subscription by using a Subscription Renewal message periodically transmitted by the selected control point, wherein the selected control point multicasts the Byebye message over the network instead of a controlled device of which operation is terminated without transmitting the Byebye message,
wherein the at least one control point is selected based on header information of a message transmitted by the at least one control point and the header information identifies a number of controlled devices which the at least one control point monitors and header information of a response message, transmitted by the controlled device as a response of the message transmitted by the at least one control point, includes a value permitting monitoring of the controlled device during the abnormal termination of the controlled device.

24. The controlled device of claim 23, wherein the control point selection unit selects another control point excluding the selected control point, if a registration release message from the selected control point is received or if a next Subscription Renewal message is not received for a predetermined time period after the Subscription Renewal message is received.

25. The controlled device of claim 23, wherein the control point selection unit comprises:
a receiving unit which receives at least one Subscription Request message;
a selection unit which selects the selected control point which is to transmit the Byebye message instead of the controlled device with reference to information included in a header of the received Subscription Request message; and a transmitting unit which transmits a message in response to the Subscription Request message with a header including the selection-associated message, and wherein the information in the header is the number of controlled devices to which the control point transmitting the Subscription Request message is to transmit the Byebye message.

26. The controlled device of claim 23, wherein the update determination unit comprises:

a receiving unit which receives the Subscription Renewal message from the selected control point;

a determination unit which determines whether or not to allow the selected control point to keep transmitting the Byebye message instead of the controlled device with reference to information included in a header of the received Subscription Renewal message and which transmits a message in response to the Subscription Renewal message with a header including a determination-associated message to the selected control point, wherein the information in the header is a number of controlled devices to which the selected control point is to transmit the Byebye message.

* * * * *